J. C. HALDEMAN.
SAFETY NUT.
APPLICATION FILED MAY 2, 1919.

1,336,955.

Patented Apr. 13, 1920.
2 SHEETS—SHEET 1.

INVENTOR
James Clyde Haldeman

Frease, Merkel, Saywell and Bond

ATTORNEYS.

J. C. HALDEMAN.
SAFETY NUT.
APPLICATION FILED MAY 2, 1919.

1,336,955.

Patented Apr. 13, 1920.
2 SHEETS—SHEET 2.

INVENTOR
James Clyde Haldeman.
Frease, Merkel, Saywell

ATTORNEYS

UNITED STATES PATENT OFFICE.

JAMES CLYDE HALDEMAN, OF SALEM, OHIO, ASSIGNOR TO THE SILVER MANUFACTURING COMPANY, OF SALEM, OHIO, A CORPORATION OF OHIO.

SAFETY-NUT.

1,336,955.  Specification of Letters Patent.  Patented Apr. 13, 1920.

Application filed May 2, 1919. Serial No. 294,185.

*To all whom it may concern:*

Be it known that I, JAMES CLYDE HALDEMAN, a citizen of the United States, residing at Salem, in the county of Columbiana and State of Ohio, have invented a new and useful Safety-Nut, of which the following is a specification.

The invention relates to drilling machines in which an arm for supporting the drill head is carried upon a vertical column and power means is provided for raising and lowering the arm, and has more especial reference to a safety device upon the raising and lowering mechanism.

In drilling machines of the character mentioned the drill arm is slidably mounted upon a vertical column and arranged to be raised and lowered upon the column by means of a screw shaft which engages a threaded bearing carried by the arm. This threaded bearing is usually made of brass or similar soft metal to obviate wear upon the screw shaft and necessarily wears to such an extent that in time the threads become entirely worn or stripped, allowing the arm to drop not only causing considerable damage and wreckage to the machine, but also endangering the lives of workmen operating the machine.

The object of the invention is to provide a safety device to prevent the arm from dropping when the threaded bearing becomes entirely worn and useless and to generally simplify and improve the raising and lowering mechanism for the arm.

The objects of the invention may be attained by providing a threaded bearing carried by the arm and engaging the screw shaft which receives the weight of the arm and a second threaded bearing pivotally or loosely mounted upon the arm and engaging the screw shaft and arranged to receive the weight of the arm only at such times as the other threaded bearing becomes entirely worn and useless. This second threaded bearing or safety nut will normally ride loosely upon the screw shaft not carrying any of the weight of the arm and not being subjected to any excessive wear but when the permanent threaded bearing becomes worn and releases the arm the safety nut will receive the full weight of the arm preventing any damage to the machine and supporting the arm until such time as a new threaded bearing may be provided.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

A practical embodiment of the invention is disclosed in the accompanying drawings, forming a part of this specification in which similar numerals of reference indicate corresponding parts throughout the several views.

Figure 1:
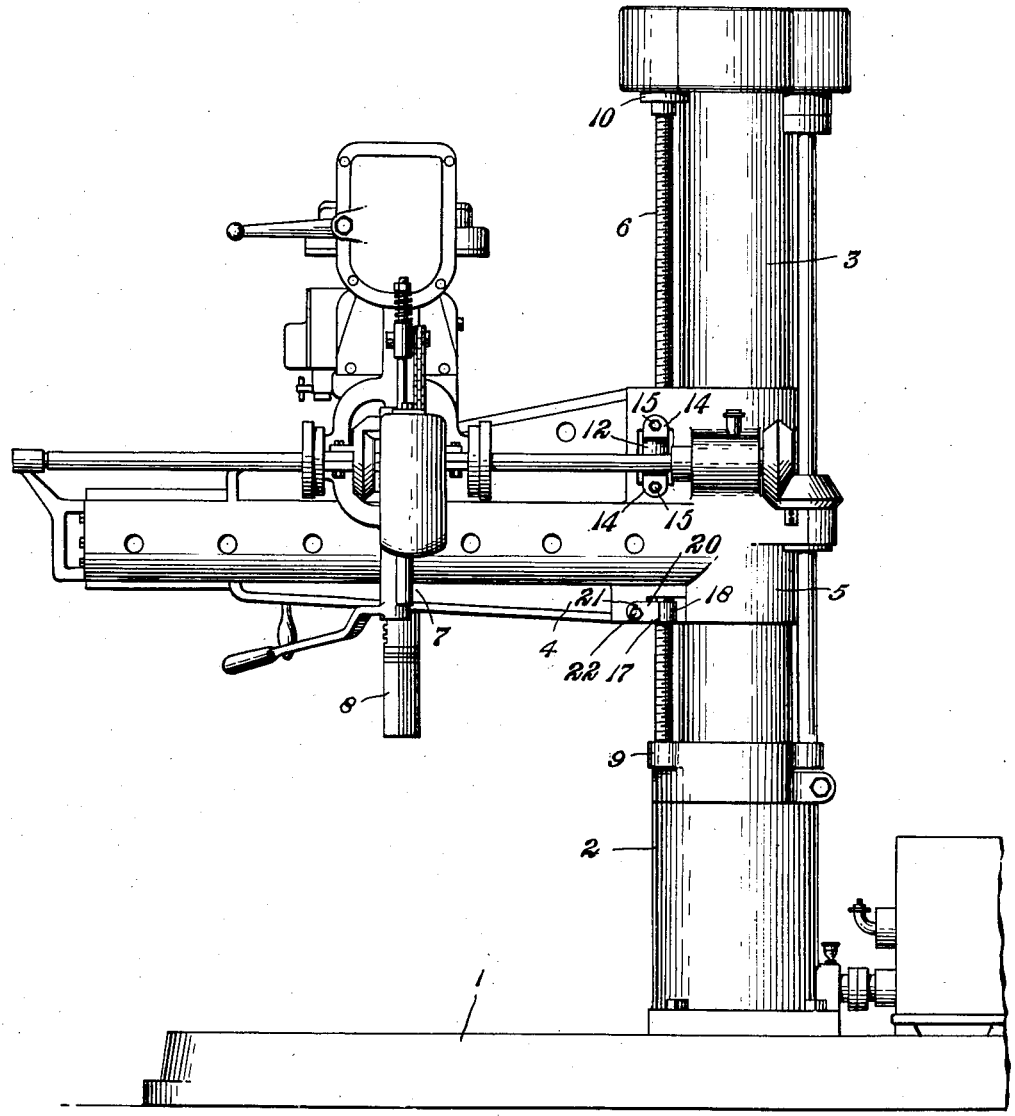
Figure 1 is a side elevation of a drilling machine embodying the invention.

Referring to the drawings, the bed 1, the base 2, column 3 and arm 4 may be of any usual and well known construction, the arm being provided with a bearing portion 5 slidably mounted upon the column 3 and arranged to be raised or lowered by means of a rotatable screw shaft 6.

A suitable drill head 7 is carried by the arm and contains the usual drill spindle 8 arranged to carry a drill of any usual and well known construction. All of these parts may be of any usual form and have no especial connection with the present invention, excepting that the safety device to which the invention pertains is adapted to be used upon drilling machines of the general character above described.

The screw shaft 6 is journaled in suitable bearings 9 and 10 in the base and top of the column respectively and is connected with power mechanism for rotating the same, said mechanism being of the usual construction and not illustrated in the present application, it only being necessary in the present showing to provide a rotatable screw shaft. The arm 4 has a vertical passage 11 formed therein, which passage receives the screw shaft 6. The threaded bearing which supports the arm upon the screw shaft is shown comprising a cylindrical portion 12 having internal screw threads 13, which engage the screw shaft, angular ears 14 being provided by means of which the bearing is connected to the arms with screws 15 or their equivalents.

The screw threaded bearing 12 is thus located in a socket 16 formed in the arm intermediate the extremities of the passage 11 and is held permanently with relation to the arm thus receiving the entire weight of the arm upon the intermediate threads 13 which are engaged by the screw shaft 6.

As this threaded bearing is made of brass or similar soft metal it will be seen that in time the excessive weight of the arm carried thereon will wear the threads 13 entirely out and as this is the only support of the arm 4, the entire arm will be allowed to drop to the bottom of the column not only wrecking the drilling machine but very probably killing or severely injuring the operator, who necessarily must take a position in close proximity to the arm in order to operate the machine.

In order to prevent the arm from dropping in this manner, causing damage and injury to the machine and workmen the safety nut 17 is provided. This safety nut comprises the cylindrical portion 18 having interior threads 19 for engagement with the screw shaft 6 and is provided with an offset angularly disposed ear 20 having a vertical, elongated slot 21 therein, through which slot a screw 22 carried by the arm 4 is located.

Figures 2, 3:
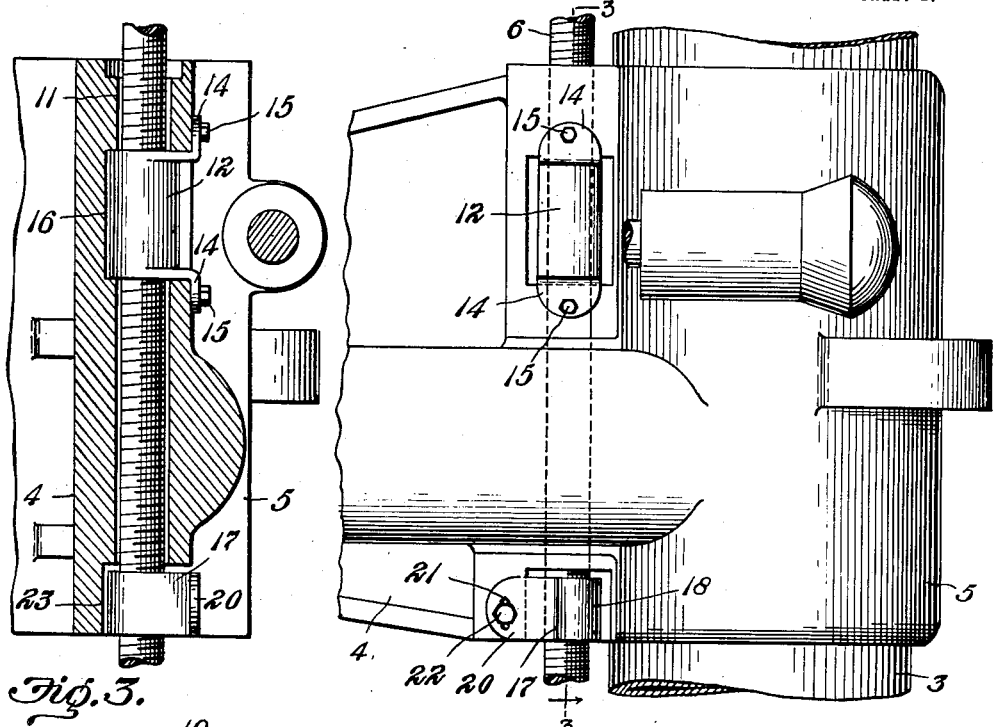
Fig. 2 is a side elevation upon an enlarged scale of a portion of the arm and column showing the safety device.
Fig. 3 is a section on line 3—3, Fig. 2.
Figure 5:
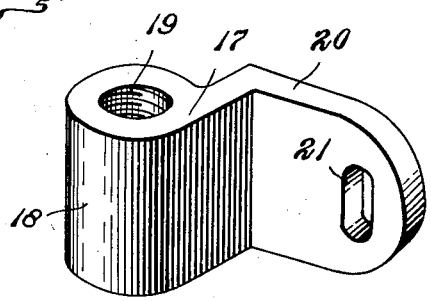
Fig. 5 is a detail perspective view of the safety nut.
Figure 4:
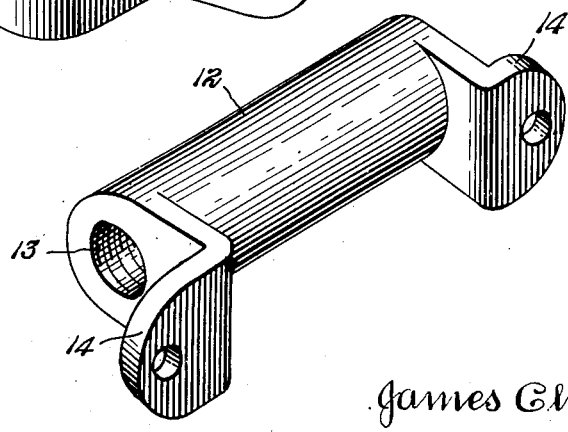
Fig. 4 is a detail perspective view of the threaded bearing.

The safety nut is mounted in the position shown in Figs. 2 and 3 of the drawings being located within the socket 23 formed in the arm 4 at the lower end of the passage 11, the upper surface of the nut being slightly spaced from the upper wall of the socket. The nut is thus loosely carried by the arm and moves idly upon the screw shaft with the raising and lowering of the arm receiving none of the weight or strain of the arm.

When the threads in the bearing 12 become entirely worn the arm will only be allowed to drop the distance between the upper wall of the socket 23 and the upper edge of the safety nut 17, the elongated slot 21 allowing for this movement between the arm and nut. At this point the upper wall of the socket 23 will engage the upper surface of the safety nut preventing any further movement of the arm upon the screw shaft, the safety nut thus receiving the entire weight of the arm. The safety nut thus becomes a substitute threaded bearing for the arm which may be used until the bearing 12 may be replaced.

I claim:

1. In a drilling machine, a column, an arm slidably mounted thereon, a screw shaft for vertically moving the arm, a threaded bearing carried by the arm engaging said screw shaft and a safety nut loosely mounted carried by the arm and engaging the screw shaft.

2. In a drilling machine, a column, an arm slidably mounted thereon, a screw shaft for vertically moving the arm, a threaded bearing carried by the arm engaging said screw shaft and a safety nut slidably connected to the arm and engaging the screw shaft.

3. In a drilling machine, a column, an arm slidably mounted thereon, a screw shaft for vertically moving the arm, a threaded bearing carried by the arm engaging said screw shaft, the arm provided with a socket and a safety nut located within said socket engaging the screw shaft and spaced from the top wall of the socket.

4. In a drilling machine, a column, an arm slidably mounted thereon, a screw shaft for vertically moving the arm, a threaded bearing carried by the arm engaging said screw shaft and a safety nut engaging the screw shaft, said nut being attached to the arm to move with, but also to have a limited movement relative to the arm.

5. In a drilling machine, a column, an arm slidably mounted thereon, a screw shaft for vertically moving the arm, a threaded bearing carried by the arm engaging said screw shaft, a safety nut engaging the screw shaft and provided with a slotted portion and a pin carried by the arm engaging said slotted portion and allowing movement of the arm relative to the safety nut.

6. In a drilling machine, a column, an arm slidably mounted thereon, a screw shaft for vertically moving the arm, a threaded bearing carried by the arm engaging said screw shaft, a safety nut engaging the screw shaft, a slotted ear upon the safety nut and a pin carried by the arm engaging said slotted ear and allowing movement of the arm relative the safety nut.

7. In a drilling machine, a column, an arm slidably mounted thereon, a screw shaft for vertically moving the arm, a threaded bearing carried by the arm engaging said screw shaft and a safety nut attached to the arm in such manner that it is permitted to have a slight movement relative to the arm but when called into use will support the arm as soon as the amount of movement is taken up.

In testimony that I claim the above, I have hereunto subscribed my name.

JAMES CLYDE HALDEMAN.